US011944989B2

(12) United States Patent
Yu et al.

(10) Patent No.: US 11,944,989 B2
(45) Date of Patent: Apr. 2, 2024

(54) AUTOMATIC RETURN SHOWER HEAD AND USE METHOD THEREOF

(71) Applicant: SINYU TECHNOLOGY (FUJIAN) CO., LTD., Fujian (CN)

(72) Inventors: Zhangjun Yu, Zhangzhou (CN); Qianzhen Fang, Zhangzhou (CN); Zhicheng Lin, Zhangzhou (CN); Huasheng Peng, Zhangzhou (CN)

(73) Assignee: SINYU TECHNOLOGY (FUJIAN) CO., LTD. (CN)

( * ) Notice: Subject to any disclaimer, the term of this patent is extended or adjusted under 35 U.S.C. 154(b) by 355 days.

(21) Appl. No.: 17/311,344

(22) PCT Filed: Nov. 2, 2020

(86) PCT No.: PCT/CN2020/125803
§ 371 (c)(1),
(2) Date: Jun. 6, 2021

(87) PCT Pub. No.: WO2022/062075
PCT Pub. Date: Mar. 31, 2022

(65) Prior Publication Data
US 2022/0088622 A1 Mar. 24, 2022

(51) Int. Cl.
*B05B 1/30* (2006.01)
*B05B 1/18* (2006.01)
*B05B 1/32* (2006.01)

(52) U.S. Cl.
CPC ............ *B05B 1/3026* (2013.01); *B05B 1/185* (2013.01); *B05B 1/3093* (2013.01); *B05B 1/326* (2013.01)

(58) Field of Classification Search
CPC .............................. B05B 1/3026; B05B 1/185
See application file for complete search history.

(56) References Cited

U.S. PATENT DOCUMENTS 8,297,538 B2 * 10/2012 Zhou ..................... E03C 1/0409 239/394
10,322,058 B1 * 6/2019 Patch ..................... A61H 19/30
(Continued)

FOREIGN PATENT DOCUMENTS

CN 201189495 2/2009
CN 201482637 5/2010
(Continued)

OTHER PUBLICATIONS

PCT Application No. PCT/CN2020/125803, International Search Report dated Jun. 23, 2021, 3 pp.
(Continued)

*Primary Examiner* — Reinaldo Sanchez-Medina
(74) *Attorney, Agent, or Firm* — BKRIP LLC

(57) ABSTRACT

An automatic return shower head and a use method thereof are provided. The automatic return shower head comprises a handle, a valve body, a water distribution disc, a switching return assembly and a shower head body configured to be connected with the handle and having a water outlet passage communicating with a water supply passage of the handle. The valve body is provided with water distribution hole(s), fixed to a joint between the shower head body and the handle, and located between the water supply passage and the water outlet passage. The water distribution disc is provided inside the joint and rotates relative to the valve body. The switching return assembly comprises a switching assembly linked with the water distribution disc, a knob provided on a wall surface of the joint and linked with the switching assembly, and a return portion linked with the knob.

20 Claims, 4 Drawing Sheets

(56) References Cited

U.S. PATENT DOCUMENTS

| | | | | |
|---|---|---|---|---|
| 11,712,705 | B2 * | 8/2023 | Ball | B05B 1/3026 239/283 |
| 2008/0156902 | A1 * | 7/2008 | Luettgen | B05B 1/16 239/447 |
| 2010/0320295 | A1 * | 12/2010 | Mang | B05B 1/3026 239/562 |
| 2013/0161549 | A1 * | 6/2013 | Zhou | B05B 1/185 251/213 |
| 2013/0247294 | A1 * | 9/2013 | Zhou | B05B 1/185 4/615 |
| 2017/0216854 | A1 * | 8/2017 | Thurgood | B05B 1/3026 |
| 2018/0051816 | A1 * | 2/2018 | Lin | F16K 3/246 |
| 2019/0283049 | A1 | 9/2019 | Lin | |
| 2020/0384486 | A1 * | 12/2020 | Ball | B05B 1/3026 |

FOREIGN PATENT DOCUMENTS

| | | | |
|---|---|---|---|
| CN | 202097046 | | 1/2012 |
| CN | 202752111 | | 2/2013 |
| CN | 204051959 | | 12/2014 |
| CN | 107716135 | A | 2/2018 |
| CN | 212702500 | | 3/2021 |
| EP | 3542905 | A1 | 9/2019 |
| JP | 1990066186 | | 5/1990 |
| JP | 2004105791 | A | 4/2004 |
| KR | 20100095802 | | 9/2010 |

OTHER PUBLICATIONS

PCT Application No. PCT/CN2020/125803, Written Opinion dated Jun. 23, 2021, 6 pp.

* cited by examiner

AUTOMATIC RETURN SHOWER HEAD AND USE METHOD THEREOF

CROSS-REFERENCE TO RELATED APPLICATION

The present disclosure claims the priority to the Chinese patent application with the filing No. 2020110140403, filed on Sep. 24, 2020 with the Chinese Patent Office, and entitled "Automatic Return Shower Head", the contents of which are incorporated herein by reference in entirety.

TECHNICAL FIELD

The present disclosure relates to the technical field of shower heads, in particular, to an automatic return shower head and a use method thereof.

BACKGROUND ART

Common function switching mechanisms of shower heads are generally provided on a front surface of a shower head panel, and after switching, switching back needs to be operated from a distal end. For multifunctional shower heads, the switching stroke is long, and the shower heads cannot be operated or switched by one hand, which results in inconvenient use of the multifunctional shower heads.

SUMMARY

The present disclosure provides an automatic return shower head, which can solve the problem that the existing multifunctional shower heads are inconvenient to use as they cannot be operated by one hand.

An embodiment of the present disclosure provides an automatic return shower head, including:

- a shower head body, configured to be connected with a handle, wherein a water supply passage of the handle communicates with a water outlet passage of the shower head body;
- a valve body, provided with at least one water distribution hole, fixed to a joint between the shower head body and the handle (i.e. a portion where the shower head body is connected with the handle), and located between the water supply passage and the water outlet passage;
- a sealing ring, configured in the valve body;
- a water distribution disc, provided inside the joint between the shower head body and the handle and capable of rotating relative to the valve body, so as to adjust a water flow entering the water outlet passage through the at least one water distribution hole from the water supply passage; and
- a switching return assembly, provided at the joint between the shower head body and the handle, and linked with the water distribution disc, wherein the switching return assembly includes: a knob, provided on a wall surface of the joint between the shower head body and the handle; a switching assembly, provided inside the joint between the shower head body and the handle; and a return portion, provided inside the joint between the shower head body and the handle, wherein the knob is linked with the switching assembly, and the switching assembly is linked with the water distribution disc, so that the water distribution disc is driven to move through the switching assembly when the knob is rotated in a forward direction, and the return portion is linked with the knob, so as to drive the knob to move in a reverse direction so as to return to an initial position;
- the handle includes a first tubular connecting portion formed at an end portion of the shower head body and a second tubular connecting portion screwed with the first tubular connecting portion.

In the above process of implementation, when using the automatic return shower head, a user may hold the handle by one hand, and rotate the knob with a finger, then the water distribution disc can be enabled to move through the switching assembly, thus, relative positions of the water distribution disc and the valve body are changed, so as to adjust relative positions of the at least one water distribution hole of the water distribution disc and the at least one switching hole of the valve body, to adjust the flow rate of discharged water of the shower head body, and complete the switching of the water flow; and when an acting force on the knob is withdrawn, the return portion operates, so that the knob return to an initial position to facilitate the operation next time. As the above actions may be completed by only one hand, the operation is convenient and quick; further, as the switching return assembly is adjacent to the valve body, after an operator rotates the knob, the switching assembly and the water distribution disc can respond quickly, which helps to improve a switching speed of the water flow of the shower head.

In an optional embodiment, the valve body has one end connected to the water outlet passage, and the other end provided with a mounting recess, and the at least one water distribution hole is formed inside the valve body;

- the water distribution disc includes a switching plate and a transmission portion, and may rotate relative to the valve body, so as to adjust the water flow entering the water outlet passage through the at least one water distribution hole;
- the switching plate is provided with at least one switching hole, and is rotatably provided in the mounting recess;
- the transmission portion has a passage inside, so as to communicate with the water supply passage, and is further connected to the switching plate, so that the water flow flows through the inside of the transmission portion to the at least one switching hole of the switching plate, and the transmission portion is linked with the switching return assembly;
- the mounting recess of the valve body is further provided therein with the sealing ring, so as to be corresponding to the at least one water distribution hole, preventing the water flow from entering the water outlet passage from the gap between the water distribution holes.

In the above process of implementation, the switching return assembly may drive the transmission portion to rotate, thereby driving the switching plate to rotate in the mounting recess, so as to change the relative positions of the switching holes and the water distribution holes, thereby realizing the switching of the water flow. As a part of the structure of the water distribution disc is located in the mounting recess, a rotating track of the water distribution disc is limited by the valve body, which facilitates the movement of the water distribution disc in a limited space, so as to avoid the case of misalignment of the water distribution disc.

In an optional embodiment, a valve cover is further provided, and the valve cover is provided at one end of the transmission portion of the water distribution disc; and

- the transmission portion passes through the valve cover, so that the switching plate is limited between the valve cover and the valve body.

In the above process of implementation, by additionally providing the valve cover, the water distribution disc and the valve body may have a stable connection relationship therebetween, and the switching plate of the water distribution disc is limited in the mounting recess, so as to avoid the water distribution disc from being disengaged from the valve body, thus facilitating the normal operation of the shower head; meanwhile, the valve cover also serves a sealing function to prevent the water flow entering the at least one water distribution hole from the water distribution disc from leaking between the valve body and the water distribution disc.

In an optional embodiment, a wall surface of the valve body is provided with the buckle, and an end surface of the valve body is provided with the annular snap structure. An end portion of the valve cover is snapped on the annular snap structure, and meanwhile, an edge of the valve cover is provided with the clamping groove so as to be snapped with the buckle. Optionally, the valve cover may be welded onto the valve body.

In an optional embodiment, the switching assembly includes a ratchet wheel and a driving block;

- the ratchet wheel is sheathed on the transmission portion; and
- the driving block is linked with the knob, and is configured with a driving ratchet and at least one transmission block, wherein the driving block is linked with the knob through snap-fit between the at least one transmission block and the at least one positioning slot of the knob. The driving ratchet is engaged with the ratchet wheel, so that when the knob is rotated in a forward direction, the ratchet wheel is driven by the driving block to rotate in the forward direction.

In the above process of implementation, the ratchet wheel and the driving block are simple in structure, and convenient to manufacture, and the ratchet wheel is driven by the driving ratchet to rotate, thus facilitating the improvement on the transmission efficiency of acting force, and ensuring the efficiency of water flow switching; meanwhile, by using the characteristic of the ratchet wheel and the ratchet, the reverse action of the driving ratchet on the ratchet wheel will not cause the ratchet wheel to move, thus normal operation of the water distribution disc can be ensured, so as to avoid occurrence of the situation that a reverse acting force of the return portion affects the water distribution disc after the acting force on the knob is withdrawn.

In an optional embodiment, the transmission portion is of an axial structure, and a wall surface thereof is provided with the at least one limiting groove;

- the ratchet wheel is sheathed on the transmission portion, an inner ring of the ratchet wheel is provided with the at least one bump, and the at least one bump is embedded in the at least one limiting groove; and
- the driving block is rotatably sheathed on the transmission portion.

In the above process of implementation, the ratchet wheel and the driving block are both sheathed on the transmission portion, which facilitates the stability of connection between the ratchet wheel, the driving block and the water distribution disc; meanwhile, the driving block rotates around the transmission portion, so that the driving block stably outputs the acting force to the water distribution disc in a correct direction, thereby ensuring the accuracy of water flow switching.

In an optional embodiment, the switching return assembly further includes a positioning claw, wherein the positioning claw is embedded in the recess of the valve cover, and acts on the ratchet wheel, so as to prevent the ratchet wheel from moving in the reverse direction.

In the above process of implementation, the positioning claw is additionally provided, so as to ensure that the ratchet wheel will not move in the reverse direction in any case, thereby ensuring that the water distribution disc will not move in the reverse direction. That is, after primary switching of water flow is completed, the force acting on the knob is withdrawn, then the return portion enables the knob to return to the initial position, but the water distribution disc is not affected thereby, and it is ensured that the water distribution disc maintains a current gear, therefore, the user may drive the water distribution disc to move by rotating the knob again in the forward direction, thus continuing to adjust the gear of the water distribution disc.

In an optional embodiment, the return portion includes an elastic device which may act on the driving block so as to drive the driving block to rotate in the reverse direction.

In the above process of implementation, the elastic device has a simple structure and a good return effect, and after the force acting on the knob is withdrawn, the driving block can quickly rotate in the reverse direction under the action of the elastic force of the elastic device, and meanwhile drive the knob to rotate so as to return to the initial position, thus facilitating the user to rotate the knob next time.

In an optional embodiment, the handle includes a first tubular connecting portion formed at an end portion of the shower head body and a second tubular connecting portion screwed with the first tubular connecting portion;

- a wall surface of the first tubular connecting portion is provided with at least one rotational through hole;
- the knob is rotatably sheathed between the first tubular connecting portion and the second tubular connecting portion; and
- a wall surface of the driving block is provided with the at least one transmission block in a protruding way, and the at least one transmission block passes through the at least one rotational through hole to be connected with the knob.

In the above process of implementation, the first tubular connecting portion and the second tubular connecting portion are detachable from each other to facilitate maintenance of the valve body, the sealing ring, the water distribution disc, and the switching return assembly; and meanwhile, the knob blocks a gap between the first tubular connecting portion and the second tubular connecting portion, so that there is a flat surface between the shower head body and the handle, thus facilitating the cleanliness of the appearance of the shower head.

In an optional embodiment, the shower head body includes an outer casing, a water outlet body, and a mask;

- the first tubular connecting portion of the handle is formed at the outer casing of the shower head body, and the water outlet body is provided between the mask and the outer casing; and
- the valve body is fixed to the outer casing by a screw, and connected to the water outlet body.

In the above process of implementation, the shower head body is simple in structure, and easy to manufacture and maintain, and the valve body is fixed inside the shower head body by a screw, thereby facilitating the connection stability between the valve body and the shower head body; and meanwhile, the mask shields the water outlet body, which facilitates the cleanliness of the appearance of the shower head body, and also protects the water outlet body from damage by foreign matters.

In an optional embodiment, a wall surface of the knob is provided with a toggle piece.

In the above process of implementation, the user holds the handle by one hand, and moves the water distribution disc by toggling the knob with a finger, thereby completing the switching of the water flow. The finger operation is simple and quick, and is suitable for one hand operation.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, therefore, they should not be considered as limitation on the scope, and those ordinarily skilled in the art still could obtain other relevant accompanying drawings according to these accompanying drawings, without paying any creative efforts.

Figure 1:
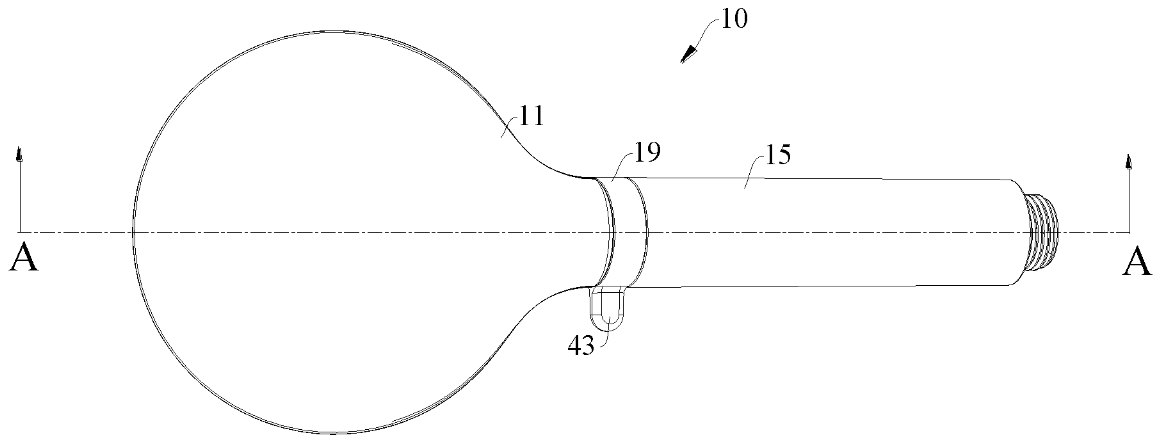
FIG. 1 is a top view of an automatic return shower head in the present embodiment.

Reference signs: 10—automatic return shower head; 11—shower head body; 12—valve body; 13—water distribution disc; 14—switching return assembly; 15—handle; 16—water supply passage; 17—water outlet passage; 18—water distribution hole; 19—knob; 20—switching assembly; 21—return portion; 22—mounting recess; 23—switching plate; 24—transmission portion; 25—switching hole; 26—sealing ring; 27—valve cover; 28—buckle; 29—annular snap structure; 30—clamping groove; 31—ratchet wheel; 32—driving block; 33—driving ratchet; 34—limiting groove; 35—bump; 36—positioning claw; 37—recess; 38—first tubular connecting portion; 39—second tubular connecting portion; 40—rotational through hole; 41—transmission block; 42—positioning slot; 43—toggle piece; 44—outer casing; 45—water outlet body; 46—mask; 47—fixing lug; 48—water inlet connector; 49—water outlet joint; 50—snap-fit structure.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with accompanying drawings in the embodiments of the present disclosure, and apparently, the embodiments described are some but not all embodiments of the present disclosure. Generally, components in the embodiments of the present disclosure, as described and shown herein in the accompanying drawings, may be arranged and designed in various different configurations.

Therefore, the detailed description below of the embodiments of the present disclosure provided in the accompanying drawings is not intended to limit the scope of the present disclosure claimed, but merely illustrates chosen embodiments of the present disclosure. All of other embodiments obtained by those ordinarily skilled in the art based on the embodiments of the present disclosure without any inventive efforts shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the embodiments of the present disclosure, it should be understood that orientation or positional relationships indicated by terms such as “center”, “upper”, “lower”, “left”, “right”, “vertical”, “horizontal”, “inner”, and “outer” are based on orientation or positional relationships as shown in the figures, or orientation or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limitation to the present disclosure.

In the description of the embodiments of the present disclosure, it further needs to be indicated that unless otherwise specified and defined explicitly, terms “provide”, “mount”, “join”, and “connect” should be construed in a broad sense, for example, it may be fixed connection, and also may be detachable connection, or integrated connection; it may be direct connection, and also may be indirect connection through an intermediate medium, or inner communication between two elements. For those ordinarily skilled in the art, specific meanings of the above-mentioned terms in the present disclosure could be understood according to specific circumstances.

It should be noted that the embodiments of the present disclosure and the features in the embodiments of the present disclosure may be combined with each other if there is no conflict.

The technical solutions in the present disclosure will be described below in conjunction with accompanying drawings.

The present embodiment provides an automatic return shower head 10, which can solve the problem that the existing multifunctional shower heads are inconvenient to use as they cannot be operated by one hand.

Figure 2:
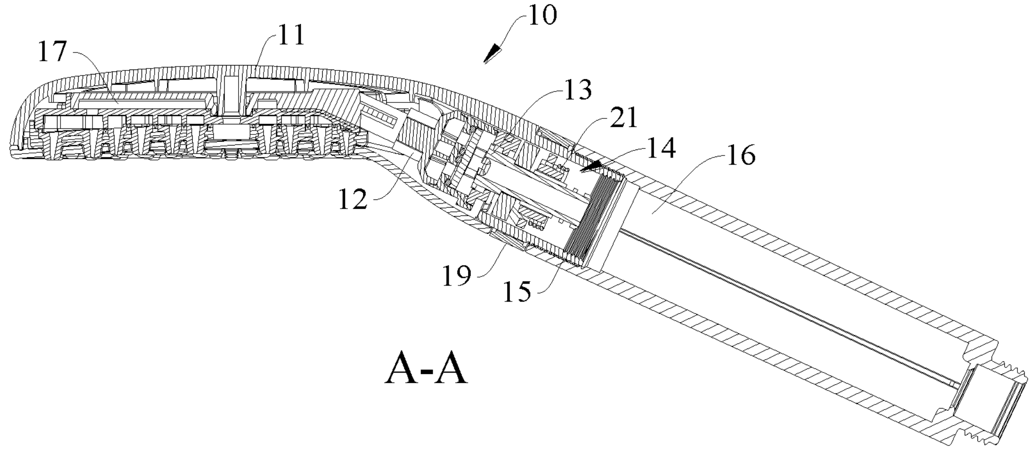
FIG. 2 is a sectional view taken along an A-A viewing angle in FIG. 1.
Figure 3:
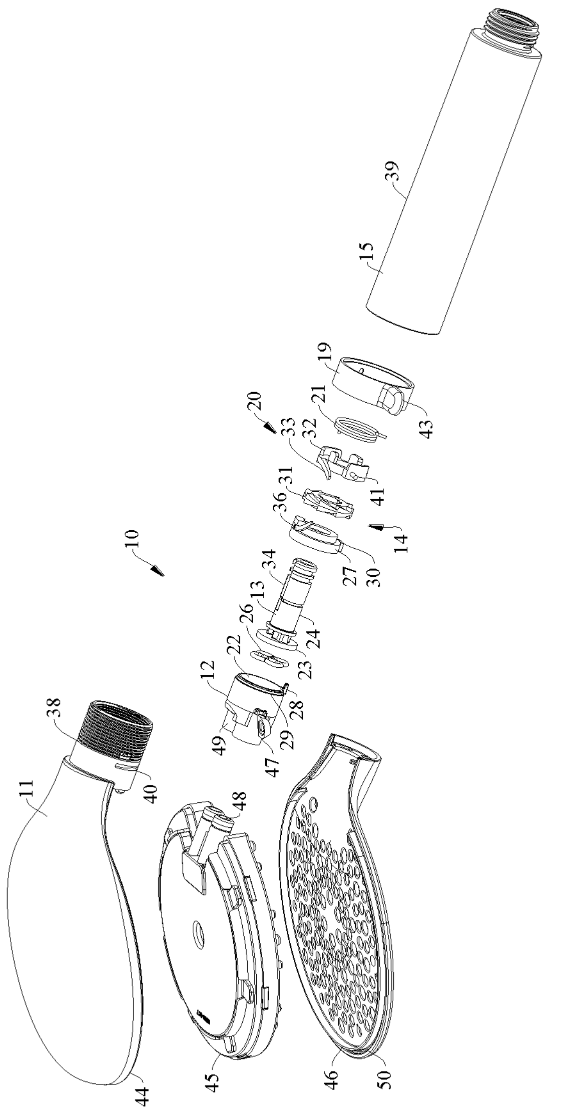
FIG. 3 is a perspective exploded view of the automatic return shower head in the present embodiment.

Referring to FIG. 1-FIG. 3, FIG. 1 is a top view of an automatic return shower head 10 in the present embodiment, FIG. 2 is a sectional view taken along an A-A viewing angle in FIG. 1, and FIG. 3 is a perspective exploded view of the automatic return shower head 10 in the present embodiment. The automatic return shower head 10 may include a shower head body 11, a valve body 12, a sealing ring 26, a water distribution disc 13, a switching return assembly 14, and a handle 15. The shower head body 11 may include an outer casing 44, a water outlet body 45, and a mask 46, wherein the water outlet body 45 has a water inlet connector 48, and the mask 46 has a snap-fit structure 50. The valve body 12 may include a mounting recess 22, a buckle 28, an annular snap structure 29, a fixing lug 47, and a water outlet joint 49. The water distribution disc 13 may include a switching plate 23, and a transmission portion 24 on which limiting grooves 34 are formed. The switching return assembly 14 may include a valve cover 27, a knob 19 on which a toggle piece 43 is formed, a switching assembly 20, and a return portion 21, wherein a clamping groove 30 is formed in the valve cover 27, and a positioning claw 36 is fixed on the valve cover 27, and the switching assembly 20 includes a ratchet wheel 31 and a driving block 32 on which a driving ratchet 33 and a transmission block 41 are formed. The handle 15 may include a first tubular connecting portion 38 formed at an end portion of the shower head body 11 and a second tubular connecting portion 39 screwed with the first tubular connecting portion 38, wherein the first tubular connecting portion 38 has a rotational through hole 40.

The shower head body 11 may be configured to be connected to the handle 15, and a water supply passage 16 of the handle 15 communicates with a water outlet passage 17 of the shower head body 11. The valve body 12, the sealing ring 26, the water distribution disc 13, and the switching return assembly 14 may be fixed in sequence to a joint between the shower head body 11 and the handle 15, and located between the water supply passage 16 and the water outlet passage 17. The water distribution disc 13 may be provided inside the joint between the shower head body 11 and the handle 15 and rotate relative to the valve body 12, so as to adjust a water flow entering the water outlet passage 17 from the water supply passage 16. The switching return assembly 14 may be linked with the water distribution disc 13. The switching return assembly 14 may include the knob 19, the switching assembly 20, and the return portion 21.

The knob 19 may be provided on a wall surface of the joint between the shower head body 11 and the handle 15. The switching assembly 20 and the return portion 21 may be provided inside the joint between the shower head body 11 and the handle 15.

In the above, the knob 19 may be linked with the switching assembly 20, and the switching assembly 20 may be linked with the water distribution disc 13, so that when the knob 19 is rotated in a forward direction, the water distribution disc 13 is driven through the switching assembly 20 to move. The return portion 21 may be linked with the knob 19, so as to drive the knob 19 to move in a reverse direction so as to return to the initial position.

In the above process of implementation, when using the automatic return shower head 10, a user may hold the handle 15 by one hand, and rotate the knob 19 with a finger, then the water distribution disc 13 can be enabled through the switching assembly 20 to move, thus, relative positions of the water distribution disc 13 and the valve body 12 are changed, so as to adjust the flow rate of discharged water of the shower head body 11, and complete the switching of the water flow, and when an acting force on the knob 19 is withdrawn, the return portion 21 operates, so that the knob 19 returns to the initial position for operation next time. As the above actions may be completed by only one hand, the operation is convenient and quick. Further, as the switching return assembly 14 is adjacent to the water distribution disc 13 and the valve body 12, after an operator rotates the knob 19, the switching assembly 20, the water distribution disc 13, and the valve body 12 can respond quickly, which helps to improve a switching speed of the water flow of the shower head.

Figure 4:
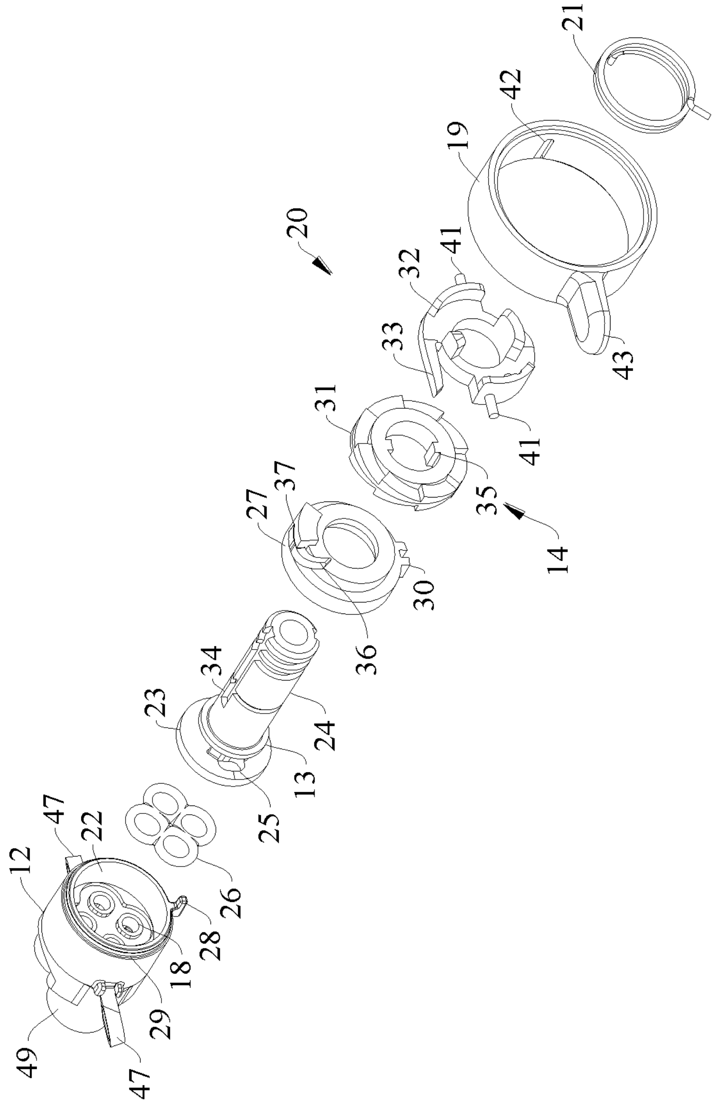
FIG. 4 is a perspective exploded view of a valve body, a sealing ring, a water distribution disc, and a switching return assembly in the present embodiment.

In the present disclosure, FIG. 4 is a perspective exploded view of the valve body 12, the sealing ring 26, the water distribution disc 13, and the switching return assembly 14 in the present embodiment. Referring to FIG. 4, from left to right are the valve body 12, the sealing ring 26, the water distribution disc 13, the valve cover 27, the ratchet wheel 31, the driving block 32, the knob 19, and the return portion 21. In the above, the valve body 12 includes water distribution holes 18, the mounting recess 22, the buckle 28, the annular snap structure 29, the fixing lugs 47, and the water outlet joint 49. The water distribution disc 13 may include the switching plate 23 on which a switching hole 25 is formed and the transmission portion 24 on which the limiting grooves 34 are formed. The valve cover 27 may be provided with a clamping groove 30 and a recess 37, wherein the positioning claw 36 is fixed in the recess 37. The switching assembly 20 may be constituted by the ratchet wheel 31 and the driving block 41, wherein the ratchet wheel 31 is arranged thereon with bumps 35, and the driving block 32 is arranged thereon with the driving ratchet 33 and the transmission blocks 41. The switching return assembly 14 may be constituted by the valve cover 27, the switching assembly 20, the return portion 21, and the knob 19, wherein a positioning slot 42 and the toggle piece 43 are formed on the knob 19.

The valve body 12 has one end connected to the water outlet passage 17, and the other end provided with the mounting recess 22, and the water distribution holes 18 may be formed inside the valve body 12. The water distribution disc 13 may include the switching plate 23 and the transmission portion 24, and can rotate relative to the valve body 12, so as to adjust the water flow entering the water outlet passage 17 through the water distribution holes 18. The switching plate 23 may be provided with the switching hole 25, and rotatably provided in the mounting recess 22. The transmission portion 24 may be connected to the switching plate 23, and linked with the switching return assembly 14.

It should be noted that the transmission portion 24 may have a passage inside, so as to communicate with the water supply passage 16, so that the water flow flows to the switching plate 23 through the inside of the transmission portion 24.

It should be noted that in the present disclosure, the valve body 12 may be provided with four water distribution holes 18, and the switching plate 23 may be provided with two switching holes 25. When the switching holes 25 are corresponding to the water distribution holes 18, water in the water supply passage 16 may pass through the switching holes 25 and the water distribution holes 18 and enter the water outlet passage 17, to realize water outlet of the shower head; when the switching holes 25 are misaligned with the water distribution holes 18, the communication between the water supply passage 16 and the water outlet passage 17 may be cut off, and no water comes out from the shower head; correspondingly, by adjusting the positions of the switching holes 25 and the water distribution holes 18, the flow rate of water flowing into the water outlet passage 17 can be adjusted. In other specific embodiments, the number of water distribution holes 18 of the valve body 12 and the number of switching holes 25 of the switching plate 23 may be other numbers.

In order to ensure the normal operation of the water flow switching, the sealing ring 26 may be further provided in the mounting recess 22, to be corresponding to the water distribution holes 18, thus preventing the water flow from entering the water outlet passage 17 through the gap between the water distribution holes 18.

In the above process of implementation, the switching return assembly 14 may drive the transmission portion 24 to rotate, thereby driving the switching plate 23 to rotate in the mounting recess 22, so as to change the relative positions of the switching holes 25 and the water distribution holes 18, thereby realizing the switching of the water flow. As a part of the structure of the water distribution disc 13, i.e. the switching plate 23, may be located in the mounting recess 22, a rotating track of the water distribution disc 13 is limited by the valve body 12, which can facilitate the movement of the water distribution disc 13 in a limited space, so as to avoid the case of misalignment of the water distribution disc 13.

In the present disclosure, the valve cover 27 may be further provided, and the valve cover 27 may be located at one end of the transmission portion 24 of the water distribution disc 13. The transmission portion 24 may pass through the valve cover 27, such that the switching plate 23 is limited between the valve cover 27 and the valve body 12.

In the above process of implementation, by additionally providing the valve cover 27, the water distribution disc 13 and the valve body 12 may have a stable connection relationship with each other, and the switching plate 23 of the water distribution disc 13 is limited in the mounting recess 22, so as to avoid the water distribution disc 13 from being disengaged from the valve body 12, thus facilitating the normal operation of the shower head; meanwhile, the valve cover 27 may also serve a sealing function to prevent the water flow entering the water distribution hole 18 from the water distribution disc 13 from leaking between the valve body 12 and the water distribution disc 13.

In the present disclosure, a wall surface of the valve body 12 may be provided with the buckle 28, and an end surface of the valve body 12 may be provided with the annular snap structure 29. An end portion of the valve cover 27 may be snapped on the annular snap structure 29, and meanwhile, an edge of the valve cover 27 may be provided with the clamping groove 30 so as to be snapped with the buckle 28.

In the above process of implementation, the valve body 12 and the valve cover 27 may be snap-fitted with each other, so that the valve body 12 and the valve cover 27 can be conveniently assembled and disassembled, thus facilitating the assembly of the water distribution disc 13 between the valve body 12 and the valve cover 27. It should be noted that in other specific embodiments, the valve cover 27 may be welded onto the valve body 12 after the water distribution disc 13 is assembled into the valve body 12.

The switching assembly 20 may include the ratchet wheel 31 and the driving block 32. The transmission portion 24 of the water distribution disc 13 may pass through the ratchet wheel 31, and the limiting grooves 34 of the transmission portion 24 and the bumps 35 of the ratchet wheel 31 are snap-fitted with each other. The driving block 32 may be provided thereon with the driving ratchet 33 and the transmission blocks 41, wherein the driving block 32 is linked with the knob 19 through snap-fit between the transmission blocks 41 and the positioning slot 42 of the knob 19. The driving ratchet 33 of the driving block 32 may be engaged with the ratchet wheel 31, so that when the knob 19 is rotated in a forward direction, the ratchet wheel 31 is driven by the driving block 32 to rotate in a forward direction, thereby driving through the transmission portion 24 the water distribution disc 13 to rotate in a forward direction.

In the above process of implementation, the ratchet wheel 31 and the driving block 32 are simple in structure, and convenient to manufacture, and the ratchet wheel 31 may be driven by the driving ratchet 33 to rotate, thus facilitating the improvement on the transmission efficiency of acting force, and ensuring the efficiency of water flow switching; meanwhile, by using the characteristic of the ratchet wheel 31 and the ratchet, the reverse action of the driving ratchet 33 on the ratchet wheel 31 will not cause the ratchet wheel 31 to move, thus normal operation of the water distribution disc 13 can be ensured, so as to avoid occurrence of the situation that a reverse acting force of the return portion 21 affects the water distribution disc 13 after the acting force on the knob 19 is withdrawn.

Figure 5:
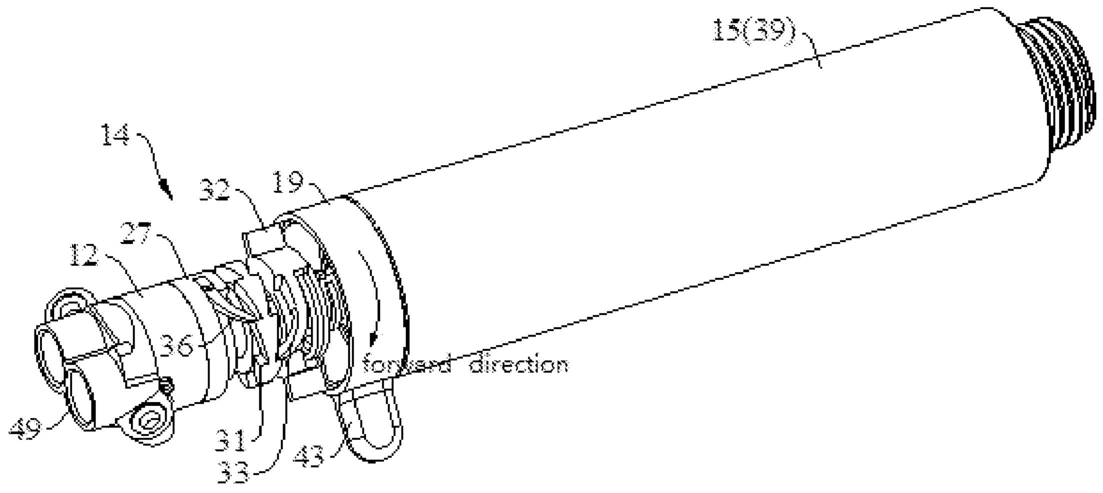
FIG. 5 is an assembly view of the valve body, the switching return assembly, and a handle after a knob is rotated in the present embodiment.
Figure 6:
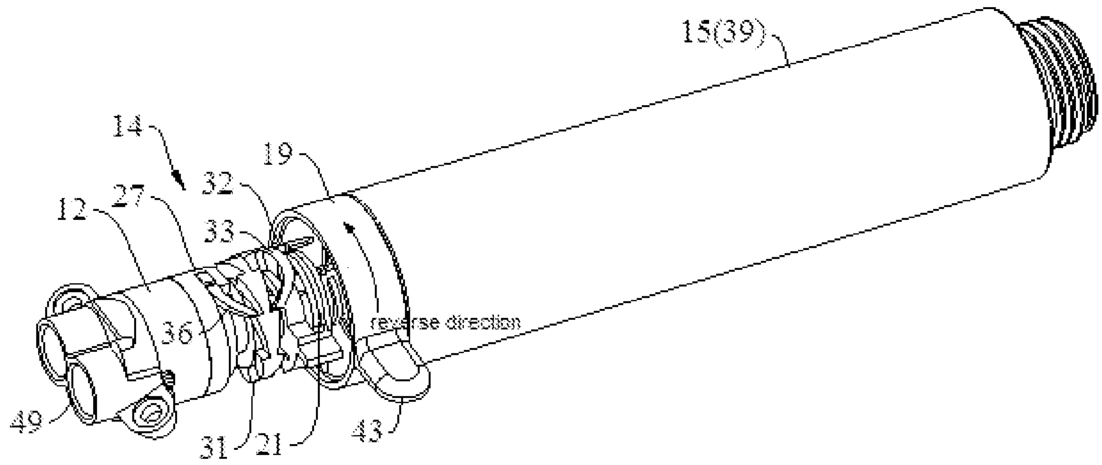
FIG. 6 is an assembly view of the valve body, the switching return assembly, and the handle after the knob returns to an initial position in the present embodiment.

In the present disclosure, referring to FIG. 5 and FIG. 6, FIG. 5 is an assembly view of the valve body 12, the switching return assembly 14, and the handle 15 after the knob 19 is rotated in the present embodiment, and FIG. 6 is an assembly view of the valve body 12, the switching return assembly 14, and the handle 15 after the knob 19 returns to the initial position in the present embodiment. It should be noted that FIG. 5 and FIG. 6 merely exemplarily illustrate forward and reverse direction pointing of rotation of the knob 19 that may be realized, and in other embodiments, it is not limited to the directions indicated in FIG. 5 and FIG. 6.

Referring to FIG. 5, after the knob 19 is rotated in the forward direction, the driving ratchet 33 on the driving block 32 may push the ratchet wheel 31 to rotate in the forward direction, so that the water distribution disc 13 (not shown) is rotated in the forward direction; referring to FIG. 6, when the driving block 32 rotates in the reverse direction, the driving ratchet 33 may slip with respect to the ratchet wheel 31, therefore, the ratchet wheel 31 will not be rotated therewith, thus not affecting the water distribution disc 13 (not shown).

In the present disclosure, referring to FIG. 4, the transmission portion 24 may be of an axial structure, and a wall surface thereof is provided with the limiting grooves 34. The ratchet wheel 31 may be sheathed on the transmission portion 24, an inner ring of the ratchet wheel 31 may be provided with the bumps 35, and the bumps 35 may be embedded in the limiting grooves 34. The driving block 32 is rotatably sheathed on the transmission portion 24.

In the above process of implementation, the ratchet wheel 31 and the driving block 32 may be both sheathed on the transmission portion 24, which facilitates the connection stability between the ratchet wheel 31, the driving block 32, and the water distribution disc 13; meanwhile, the driving block 32 may rotate around the transmission portion 24, so that the driving block 32 stably outputs the acting force to the water distribution disc 13 in a correct direction, thereby ensuring the accuracy of water flow switching.

It should be noted that, in the present disclosure, the number of limiting grooves 34 may be two, and they are symmetrically provided on a wall surface of the transmission portion 24, the inner ring of the ratchet wheel 31 may be correspondingly provided with two bumps 35, so as to be embedded in the limiting grooves 34 respectively, thereby facilitating the connection stability between the ratchet wheel 31 and the water distribution disc 13, and meanwhile also facilitating that the ratchet wheel 31 can stably drive the water distribution disc 13 to rotate. In other specific implementations, the number of limiting grooves 34 may be other numbers, and they may also be located at other positions of the wall surface of the transmission portion 24, as long as the number and positions of bumps 35 correspond thereto. The ratchet wheel 31 may also be connected to the transmission portion 24 by a fixing member, for example, fixed onto the transmission portion 24 by screws.

In the present disclosure, the switching return assembly 14 may further include the positioning claw 36, wherein the positioning claw 36 is provided in the recess 37 of the valve cover 27, and acts on the ratchet wheel 31, so as to prevent the ratchet wheel 31 from moving in the reverse direction.

In the above process of implementation, the positioning claw 36 may be additionally provided, so as to ensure that the ratchet wheel 31 will not move in the reverse direction in any case, thereby ensuring that the water distribution disc 13 will not move in the reverse direction. That is, after primary switching of water flow is completed, the force acting on the knob 19 is withdrawn, then the return portion 21 makes the knob 19 return to the initial position, but the water distribution disc 13 is not affected thereby, and it is ensured that the water distribution disc 13 maintains a current gear, therefore, the user may drive the water distribution disc 13 to move in the forward direction by rotating the knob 19 again in the forward direction, thus continuing to adjust the gear of the water distribution disc 13.

It should be noted that, in the present disclosure, the positioning claw 36 may be provided at the end portion of the valve cover 27. For the convenience of assembly, the end portion of the valve cover 27 may be provided with the recess 37, so that the positioning claw 36 is embedded in the recess 37.

In the present disclosure, the return portion 21 may include an elastic device which acts on the driving block 32 so as to drive the driving block 32 to rotate in the reverse direction.

In the above process of implementation, the elastic device has a simple structure and a good return effect, and after the force acting on the knob 19 is withdrawn, the driving block 32 can quickly rotate in the reverse direction under the action of the elastic force of the elastic device, and meanwhile drive the knob 19 to rotate so as to return to the initial position, thus facilitating the user to rotate the knob 19 next time.

It should be noted that the elastic device includes, but is not limited to, a spring, a torsion spring, an elastic sheet, or other elastic structures. For example, in the present disclosure, the elastic device is an annular spring, which is fixed between the handle 15 and the driving block 32.

In the present disclosure, referring to FIG. 3, the handle 15 may include a first tubular connecting portion 38 formed at an end portion of the shower head body 11 and a second tubular connecting portion 39 screwed with the first tubular connecting portion 38. A wall surface of the first tubular connecting portion 38 may be provided with a rotational through hole 40. The knob 19 is rotatably sheathed between the first tubular connecting portion 38 and the second tubular connecting portion 39. A wall surface of the driving block 32 may be provided with the transmission block 41, and the transmission block 41 is enabled to pass through the rotational through hole 40 and be connected with the knob 19.

In the above process of implementation, the first tubular connecting portion 38 and the second tubular connecting portion 39 are detachable from each other to facilitate maintenance of the valve body 12, the sealing ring 26, the water distribution disc 13, and the switching return assembly 14; and meanwhile, the knob 19 may block a gap between the first tubular connecting portion 38 and the second tubular connecting portion 39, so that there is a flat surface between the shower head body 11 and the handle 15, thus facilitating the cleanliness of the appearance of the shower head.

It should be noted that as shown in FIG. 4, in the present disclosure, the number of rotational through holes 40 may be two, and the two rotational through holes are formed at intervals on a wall surface of the first tubular connecting portion 38, the wall surface of the driving block 32 may be correspondingly provided with two transmission blocks 41, and an inner wall of the knob 19 may be provided with two positioning slots 42 corresponding to the two transmission blocks 41. The transmission blocks 41 may be positioned in the positioning slots 42 through the rotational through holes 40, so as to ensure the connection stability between the knob 19 and the driving block 32, and meanwhile also ensure that the knob 19 can smoothly drive the driving block 32 to rotate. The number of rotational through holes 40 may be other numbers, and they may also be located at other positions of the wall surface of the first tubular connecting portion 38 at intervals, as long as the number and positions of corresponding transmission blocks 41 on the wall surface of the driving block 32 and the number and positions of corresponding positioning slots 42 on the inner wall of the knob 19 correspond thereto.

In the present disclosure, the wall surface of the knob 19 may be provided with the toggle piece 43.

In the above process of implementation, the user may hold the handle 15 by one hand, and may move the water distribution disc 13 by toggling the knob 19 with a finger, thereby completing the switching of the water flow. The finger operation is simple and quick, and is suitable for one hand operation.

It should be noted that, in other specific embodiments, the wall surface of the knob 19 may also be provided with a structure such as straight tooth, oblique tooth, or recess 37, instead of the above toggle piece 43, which can also facilitate the user in manipulating the knob 19 to rotate.

In the present disclosure, as shown in FIG. 3, the shower head body 11 may include the outer casing 44, the water outlet body 45, and the mask 46. The first tubular connecting portion 38 of the handle 15 may be formed on the outer casing 44, and the water outlet body 45 may be provided between the mask 46 and the outer casing 44. The valve body 12 may be fixed to the outer casing 44 by a screw, and connected to the water outlet body 45.

In the above process of implementation, the shower head body 11 is simple in structure, and easy to manufacture and maintain, and the valve body 12 may be fixed inside the shower head body 11 by a screw, thereby facilitating the connection stability between the valve body 12 and the shower head body 11; and meanwhile, the mask 46 may shield the water outlet body 45, which facilitates the cleanliness of the appearance of the shower head body 11, and also protects the water outlet body 45 from damage by foreign matters.

It should be noted that in the present disclosure, the wall surface of the valve body 12 may be provided with fixing lugs 47 in a protruding way, and the fixing lug 47 may be provided with a through hole, so that the screw passes through the through hole to make the valve body 12 fixed with the outer casing 44. The water outlet passage 17 may be formed inside the water outlet body 45, an end portion of the water outlet body 45 may be configured with a water inlet connector 48, and an end portion of the valve body 12 may be configured with a water outlet joint 49. The connection stability between the valve body 12 and the water outlet body 45 can be ensured by plug-in of the water outlet joint 49 of the valve body 12 with the water inlet connector 48 of the water outlet body 45, and meanwhile the sealing effect between the valve body 12 and the water outlet body 45 is also ensured. It should be noted that the edge of the mask 46 may be provided with the snap-fit structure 50 so as to be engaged with the outer casing 44, and facilitate assembly and disassembly.

The above-mentioned are merely for preferred embodiments of the present disclosure and not used to limit the present disclosure. For one skilled in the art, the present disclosure may have various modifications and changes. Any modifications, equivalent substitutions, improvements and so on, within the spirit and principle of the present disclosure, should be covered within the scope of protection of the present disclosure.

INDUSTRIAL APPLICABILITY

The present embodiment provides an automatic return shower head, which can solve the problem that the existing multifunctional shower heads are inconvenient to use as they cannot be operated by one hand. The operation action of the automatic return shower head in the present disclosure is simple and quick, and is suitable for one-hand operation. The automatic return shower head in the present disclosure can quickly respond to one-hand operation, which facilitates increasing the water flow switching speed of the shower head, is beneficial to the cleanliness of the appearance of the shower head body 11, and meanwhile is convenient for assembly, disassembly, and maintenance.

What is claimed is:

1. An automatic return shower head, comprising:

a shower head body, provided with a handle, wherein a water supply passage of the handle communicates with a water outlet passage of the shower head body;

a valve body, provided with at least one water distribution hole, fixed to a joint between the shower head body and the handle, and located between the water supply passage and the water outlet passage;

a water distribution disc, provided inside the handle and configured to be rotatable relative to the valve body so as to adjust a water flow entering the water outlet passage through the at least one water distribution hole; and a switching return assembly, provided at the handle and linked with the water distribution disc, wherein the switching return assembly comprises:

a knob, provided on a wall surface of the handle;

a switching assembly, provided inside the handle; and a return portion, provided inside the handle, wherein the knob is linked with the switching assembly, and the switching assembly is linked with the water distribution disc, so that the water distribution disc is driven to move by rotating the knob in a forward direction; and the return portion is linked with the knob, so as to drive the knob to move in a reverse direction so as to return to an initial position.

2. The automatic return shower head according to claim 1, wherein the automatic return shower head further comprises a sealing ring, and the sealing ring is provided in the valve body.

3. The automatic return shower head according to claim 1, wherein the handle comprises a first tubular connecting portion and a second tubular connecting portion screwed with the first tubular connecting portion, wherein the first tubular connecting portion is provided on an end portion of the shower head body.

4. The automatic return shower head according to claim 3, wherein the shower head body comprises an outer casing, a water outlet body, and a mask, wherein the outer casing is provided with the first tubular connecting portion, and is fixed with the valve body connected to the water outlet body;

the water outlet body is provided between the mask and the outer casing, the water outlet passage is formed inside the water outlet body, and an end portion of the water outlet body is provided with a water inlet connector; and an edge of the mask is provided with a snap-fit structure so as to be engaged with the outer casing.

5. The automatic return shower head according to claim 4, wherein the valve body has one end connected to the water outlet passage, and the other end forming a mounting recess, and the at least one water distribution hole is formed inside the valve body;

a wall surface of the valve body is provided with a buckle;

an end surface of the valve body is provided with an annular snap structure;

an end portion of a valve cover is provided with a water outlet joint configured for being in plug-in connection with the water inlet connector of the water outlet body; and the wall surface of the valve body is provided with at least one fixing lug in a protruding way, and the at least one fixing lug is provided with a through hole configured to allow a screw to pass therethrough to make the valve body fixed with an outer casing.

6. The automatic return shower head according to claim 1, wherein the at least one water distribution hole comprises four water distribution holes.

7. The automatic return shower head according to claim 5, wherein the water distribution disc is provided inside the joint between the shower head body and the handle, and comprises a switching plate and a transmission portion, wherein the switching plate is provided with at least one switching hole, and is rotatably provided in the mounting recess of the valve body;

the transmission portion has a passage inside, so as to communicate with the water supply passage, so that a water flow flows to the switching plate through the inside of the transmission portion;

the transmission portion is of an axial structure, and is provided thereon with at least one limiting groove; and the transmission portion is connected to the switching plate, and is linked with the switching return assembly through the at least one limiting groove.

8. The automatic return shower head according to claim 7, wherein the at least one switching hole comprises two switching holes.

9. The automatic return shower head according to claim 1, wherein the switching return assembly is provided at the joint between the shower head body and the handle, and comprises:

the switching assembly, provided inside the joint between the shower head body and the handle; and the knob, arranged on a wall surface of the joint between the shower head body and the handle, and provided thereon with at least one positioning slot, wherein the knob is linked with the switching assembly, and the switching assembly is linked with the water distribution disc, so that the water distribution disc is driven to move by rotating the knob in a forward direction; and the return portion, provided inside the joint between the shower head body and the handle, and linked with the knob, so as to drive the knob to move in a reverse direction so as to return to an initial position.

10. The automatic return shower head according to claim 7, wherein the switching return assembly further comprises a valve cover, wherein the valve cover is arranged at one end of the transmission portion of the water distribution disc, and provided thereon with a recess;

the transmission portion passes through the valve cover, so that the switching plate is limited between the valve cover and the valve body;

an end portion of the valve cover is snapped on the annular snap structure of the valve body; and an edge of the valve cover is provided with a clamping groove configured to be snapped with the buckle.

11. The automatic return shower head according to claim 7, wherein the switching assembly comprises a ratchet wheel and a driving block;

the ratchet wheel and the driving block are sheathed on the transmission portion of the water distribution disc, and the driving block is configured to be rotatable around the transmission portion;

an inner ring of the ratchet wheel is provided with at least one bump, and the at least one bump is embedded in the at least one limiting groove of the transmission portion, so that the ratchet wheel is linked with the transmission portion; the driving block comprises a driving ratchet and at least one transmission block provided in a protruding way on a wall surface of the driving block, wherein the driving block is linked with the knob through snap-fit between the at least one transmission block and at least one positioning slot of the knob; and the driving ratchet is engaged with the ratchet wheel, so as to drive the ratchet wheel to rotate in a forward direction.

12. The automatic return shower head according to claim 11, wherein the switching return assembly further comprises a positioning claw, and the positioning claw is embedded in the recess of the valve cover, and configured to act on the ratchet wheel so as to prevent the ratchet wheel from moving in a reverse direction.

13. The automatic return shower head according to claim 11, wherein the return portion comprises an elastic device configured to act on the driving block so as to drive the driving block to rotate in a reverse direction.

14. The automatic return shower head according to claim 11, wherein a wall surface of the first tubular connecting portion of the handle is provided with at least one rotational through hole;

the knob of the switching return assembly is rotatably sheathed between the first tubular connecting portion and the second tubular connecting portion; and the at least one transmission block of the driving block passes through the at least one rotational through hole and is connected with the knob.

15. The automatic return shower head according to claim 1, wherein a wall surface of the knob is provided with a toggle piece, and the toggle piece is configured to enable a user to manipulate the knob to rotate by one hand.

16. A use method of the automatic return shower head according to claim 1, wherein the method comprises: rotating the knob of the switching return assembly in a forward direction, so as to drive a transmission portion of the water distribution disc to rotate, and further drive a switching plate of the water distribution disc to rotate in the forward direction in a mounting recess of the valve body, thus changing relative positions of at least one switching hole and the at least one water distribution hole to adjust a gear of the water distribution disc.

17. The use method of the automatic return shower head according to claim 16, wherein the method further comprises: withdrawing a force for rotating the knob in the forward direction, so as to enable the return portion to rotate in a reverse direction and meanwhile drive the knob to rotate so as to return to an initial position; and making a positioning claw provided in a recess of a valve cover to act on a ratchet wheel of the switching return assembly, so as to prevent the ratchet wheel from moving in the reverse direction, and making a driving ratchet of a driving block to slip with respect to the ratchet wheel, so as to ensure that the water distribution disc is not affected by returning of the knob and maintains a current gear.

18. The automatic return shower head according to claim 2, wherein the handle comprises a first tubular connecting portion and a second tubular connecting portion screwed with the first tubular connecting portion.

19. The automatic return shower head according to claim 18, wherein the shower head body comprises an outer casing, a water outlet body, and a mask, wherein the outer casing is provided with the first tubular connecting portion, and is fixed with the valve body connected to the water outlet body;

the water outlet body is provided between the mask and the outer casing, the water outlet passage is formed inside the water outlet body, and an end portion of the water outlet body is provided with a water inlet connector; and an edge of the mask is provided with a snap-fit structure so as to be engaged with the outer casing.

20. The automatic return shower head according to claim 19, wherein the valve body has one end connected to the water outlet passage, and the other end forming a mounting recess, and the at least one water distribution hole is formed inside the valve body;

a wall surface of the valve body is provided with a buckle;

an end surface of the valve body is provided with an annular snap structure;

an end portion of a valve cover is provided with a water outlet joint configured for being in plug-in connection with the water inlet connector of the water outlet body; and the wall surface of the valve body is provided with at least one fixing lug in a protruding way, and the at least one fixing lug is provided with a through hole configured to allow a screw to pass therethrough to make the valve body fixed with the outer casing.

* * * * *